US012792980B2

(12) United States Patent
Bidner et al.

(10) Patent No.: US 12,792,980 B2
(45) Date of Patent: Nov. 10, 2026

(54) MANAGING HOTEL GUEST SATISFACTION WITHIN AN AUTOMATED GUEST SATISFACTION AND SERVICES SCHEDULING SYSTEM

(71) Applicant: The Hotel Communication Network, Inc., Ottawa (CA)

(72) Inventors: Kevin Bidner, Ottawa (CA); James M. Behmke, Boston, MA (US)

(73) Assignee: The Hotel Communication Network, Inc., Ottawa (CA)

( * ) Notice: Subject to any disclaimer, the term of this patent is extended or adjusted under 35 U.S.C. 154(b) by 406 days.

(21) Appl. No.: 17/442,924

(22) PCT Filed: Mar. 25, 2020

(86) PCT No.: PCT/IB2020/000266

§ 371 (c)(1),
(2) Date: Sep. 24, 2021

(87) PCT Pub. No.: WO2020/194060

PCT Pub. Date: Oct. 1, 2020

(65) Prior Publication Data

US 2022/0253955 A1 Aug. 11, 2022

Related U.S. Application Data

(60) Provisional application No. 62/823,474, filed on Mar. 25, 2019.

(51) Int. Cl.
*G06Q 10/0631* (2023.01)
*G06F 3/0482* (2013.01)
(Continued)

(52) U.S. Cl.
CPC ..... *G06Q 10/06311* (2013.01); *G06F 3/0482* (2013.01); *G06Q 10/02* (2013.01);
(Continued)

(58) Field of Classification Search
CPC .... G06Q 50/12; G06Q 30/0282; G06Q 10/02; G06Q 30/016; G06Q 30/0203; G06F 3/0482; G06F 3/0484; H04N 21/2143
See application file for complete search history.

(56) References Cited

U.S. PATENT DOCUMENTS 8,800,866 B1 * 8/2014 Gromley ............... G07F 19/202
235/375
10,521,988 B1 * 12/2019 Allibhoy ............ G07C 9/00904
(Continued)

OTHER PUBLICATIONS

Mooney, "5 Ways We're Embracing Smart Tech in Hotel Design," OCCA, May 18, 2018, Retrieved from https://occa-design.com/blog/hotel-technology-5-ways-were-embracing-smart-tech-in-hotel-design/ (Year: 2018).*
(Continued)

*Primary Examiner* — Bryan J Kirk
(74) *Attorney, Agent, or Firm* — Lee & Hayes, P.C.

(57) ABSTRACT

The techniques herein are directed generally to managing hotel guest satisfaction within an automated guest satisfaction and services scheduling system. In particular, in the present disclosure, for instance, the techniques herein provide a method and system to manage guest satisfaction and to allow guests to easily navigate various satisfaction-based facilities through the interactive interface. For instance, the interface may include various modal notifications regarding guest experience inquiries, such as requesting the guest to enter their current assessment of their stay or to note any issues. The system also allows various navigations through the interface depending on multiple factors, including directing the guests to associated review platforms.

18 Claims, 10 Drawing Sheets

(51) Int. Cl.

| | |
|---|---|
| ***G06Q 10/02*** | (2012.01) |
| ***G06Q 30/016*** | (2023.01) |
| ***G06Q 30/0226*** | (2023.01) |
| ***G06Q 30/0282*** | (2023.01) |
| ***G06Q 30/0283*** | (2023.01) |
| ***G06Q 50/12*** | (2012.01) |

(52) U.S. Cl.

CPC ....... *G06Q 30/016* (2013.01); *G06Q 30/0226* (2013.01); *G06Q 30/0282* (2013.01); *G06Q 30/0283* (2013.01); *G06Q 50/12* (2013.01)

(56) References Cited

U.S. PATENT DOCUMENTS

| | | | | |
|---|---|---|---|---|
| 10,686,856 | B1 * | 6/2020 | Straitiff .............. | H04N 21/4227 |
| 11,176,567 | B1 * | 11/2021 | Schweinfurth .... | G06Q 30/0224 |
| 2008/0279117 | A1 | 11/2008 | Brisco et al. | |
| 2012/0240060 | A1 * | 9/2012 | Pennington ........... | G06F 3/0484<br>715/753 |
| 2013/0041720 | A1 | 2/2013 | Spires et al. | |
| 2017/0186055 | A1 * | 6/2017 | Silkey ................ | G06Q 30/0278 |
| 2018/0365741 | A1 * | 12/2018 | Ryu ...................... | H04W 4/029 |
| 2019/0110187 | A1 | 4/2019 | Quiros et al. | |
| 2020/0273058 | A1 * | 8/2020 | Mori .................. | G06Q 30/0226 |

OTHER PUBLICATIONS

International Search Report issued on Jun. 26, 2020 in connection with International Patent Application No. PCT/IB2020/000266.

* cited by examiner

MANAGING HOTEL GUEST SATISFACTION WITHIN AN AUTOMATED GUEST SATISFACTION AND SERVICES SCHEDULING SYSTEM

RELATED APPLICATIONS

This application is a U.S. National Stage Application of PCT/IB2020/000266, filed Mar. 25, 2020, entitled MANAGING HOTEL GUEST SATISFACTION WITHIN AN AUTOMATED GUEST SATISFACTION AND SERVICES SCHEDULING SYSTEM, by Kevin Bidner, et al., which claims priority to U.S. Provisional Application No. 62/823,474, filed on Mar. 25, 2019, entitled AUTOMATED GUEST SATISFACTION AND SERVICES SCHEDULING SYSTEM, by Kevin Bidner, the contents of which being incorporated herein by reference in its entirety.

TECHNICAL FIELD

The present disclosure relates generally to hotel management systems, and, more particularly, to managing hotel guest satisfaction within an automated guest satisfaction and services scheduling system.

BACKGROUND

Guest satisfaction is paramount to hotel operations. Sophisticated travelers expect top-notch service and flawless execution of operations during their stay. It is thus important for hotels to monitor guest satisfaction, and to manage expectations and remediation efforts. This is especially true in today's social media environment, where ratings and reviews are critical to the success of a hotel.

At the same time, much of a hotel's success is also based on the ability to efficiently manage and schedule services such as housekeeping. Since guests each have their own schedules, including check-in time, check-out time, and times when they are out of their hotel rooms, scheduling such services can often be a difficult task. Inefficiencies can also be exacerbated when guests leave "Do Not Disturb" signs on their doors or remain in their rooms during housekeeping hours, resulting in the potential for service overstaffing and/or becoming bothersome to a guest's experience.

SUMMARY

The techniques herein are directed generally to managing hotel guest satisfaction within an automated guest satisfaction and services scheduling system. Specifically, the systems and methods described herein may be implemented in a hotel by providing a communication terminal in each guest's assigned room. Such devices may communicate with a server and software system to provide on-demand access to both static and dynamic information and provided content. An interactive interface on the communication terminals provides coordination between the guest and the hotel to thus manage guest satisfaction and service scheduling, accordingly.

In the present disclosure, for instance, the techniques herein provide a method and system to manage guest satisfaction and to allow guests to easily navigate various satisfaction-based facilities through the interactive interface. For instance, the interface may include various modal notifications regarding guest experience inquiries, such as requesting the guest to enter their current assessment of their stay or to note any issues. The system also allows various navigations through the interface depending on multiple factors, including directing the guests to associated review platforms.

In one particular embodiment, a system herein comprises: a server; and a plurality of communication terminals in communication with the server, each of the communication terminals having a graphical user interface (GUI) and being associated with a respective room of a plurality of hotel rooms of a hotel; wherein the server is configured to: receive registration information when a guest checks into the hotel, the registration information including an identification of the guest and a particular assigned room of the plurality of hotel rooms; and identify a particular communication terminal of the plurality of communication terminals that is associated with the particular assigned room; and wherein the particular communication terminal is configured to: present an interactive interface on a corresponding GUI of the particular communication terminal, the presented interactive interface querying the guest to select a satisfaction assessment from a plurality of options, the plurality of options comprising at least one positive option and one negative option; receive a selection of a particular satisfaction assessment; present, on the interactive interface and in response to selection of a positive option as the particular satisfaction assessment, one or both of a loyalty program signup and a review platform; and present, on the interactive interface and in response to selection of a negative option as the particular satisfaction assessment, one or more remediation actions for selection by the guest.

In another particular embodiment, a method herein comprises: receiving, at a server, registration information when a guest checks into a hotel, the registration information including an identification of the guest and a particular assigned room of a plurality of hotel rooms of the hotel; identifying, by the server, a particular communication terminal of a plurality of communication terminals in communication with the server that is associated with the particular assigned room, wherein each of the communication terminals has a graphical user interface (GUI) and is associated with a respective room of the plurality of hotel rooms of the hotel; and causing, by the server, the particular communication terminal to: present an interactive interface on a corresponding GUI of the particular communication terminal, the presented interactive interface querying the guest to select a satisfaction assessment from a plurality of options, the plurality of options comprising at least one positive option and one negative option; receive a selection of a particular satisfaction assessment; present, on the interactive interface and in response to selection of a positive option as the particular satisfaction assessment, one or both of a loyalty program signup and a review platform; and present, on the interactive interface and in response to selection of a negative option as the particular satisfaction assessment, one or more remediation actions for selection by the guest.

In still another particular embodiment, a method herein comprises: receiving, at a particular communication terminal of a plurality of communication terminals, identification of a guest, wherein the particular communication terminal is associated with a particular room of a plurality of hotel rooms of a hotel, and wherein the guest has checked into the hotel and has been assigned to the particular room; presenting, on a corresponding graphical user interface (GUI) of the particular communication terminal, an interactive interface querying the guest to select a satisfaction assessment from a plurality of options, the plurality of options comprising at least one positive option and one negative option; receiving, on the interactive interface, a selection of a particular satisfaction assessment; presenting, on the interactive interface and in response to selection of a positive option as the particular satisfaction assessment, one or both of a loyalty program signup and a review platform; and presenting, on the interactive interface and in response to selection of a negative option as the particular satisfaction assessment, one or more remediation actions for selection by the guest.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
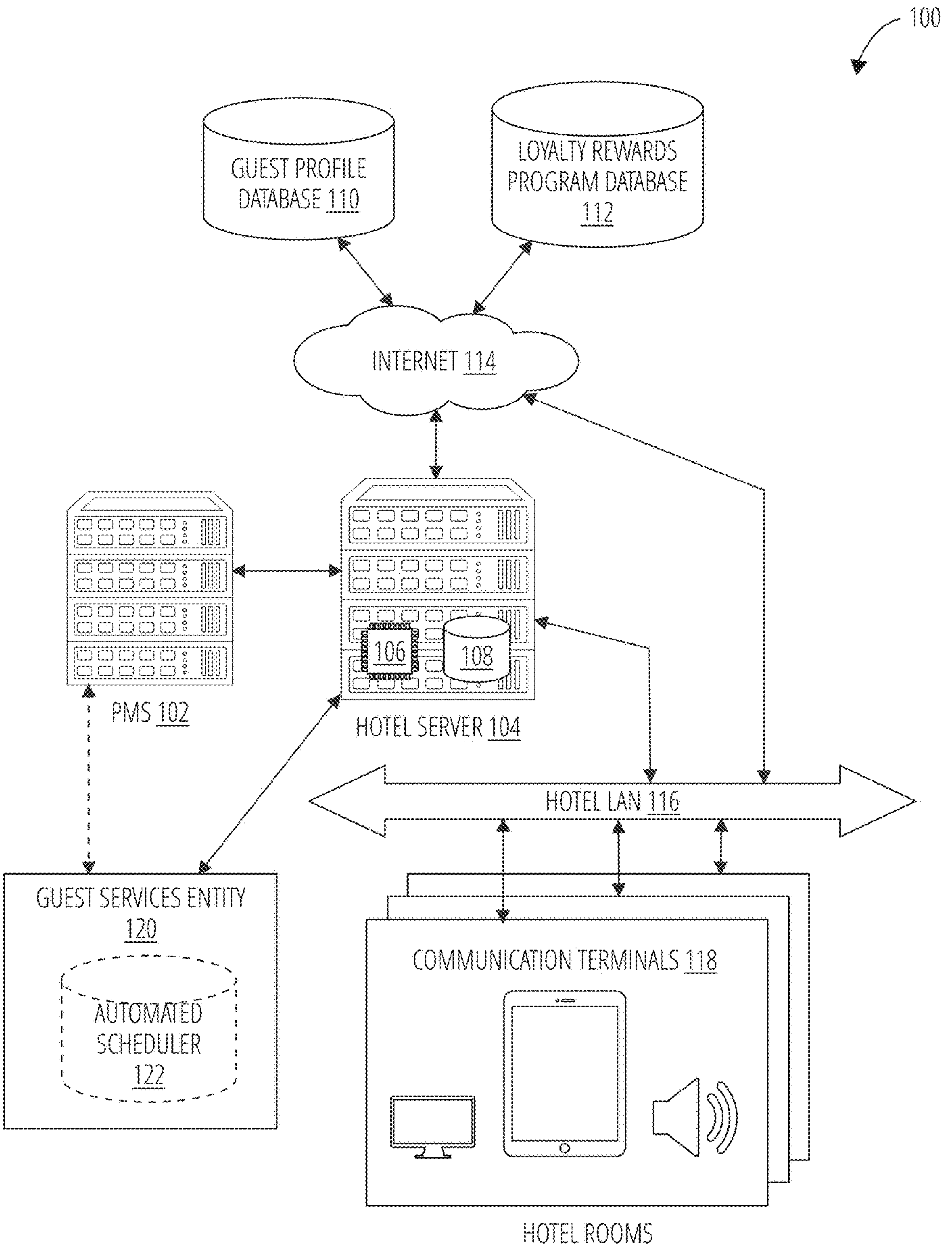
FIG. 1 illustrates an example system in accordance with one embodiment.

As noted above, guest satisfaction is paramount to hotel operations, as is the ability to efficiently manage and schedule services and resources. For instance, guests have their own expectations and tolerances, as well as their own schedules, including check-in time, check-out time, and times when they are out of their hotel rooms.

Typically, for instance, hotel housekeeping services may staff the personnel needed to clean every occupied room each day, but this could easily result in frequent overstaffing and schedule inefficiencies. With no way to predict which guests might hang a "Do Not Disturb" tag or remain in their room, a hotel must plan for the heaviest workload, and housekeeping personnel must walk the halls several times a day, until all rooms are finished. A room physically occupied by a guest may need to be visited several times, and one last check might be needed to confirm that rooms not to be disturbed earlier in the day are still tagged as "Do Not Disturb."

In addition to overstaffing and inefficiency, a conventional housekeeping model may detract from the guest experience. Even guests who have opted out of housekeeping services may be disturbed by housekeeping personnel knocking on doors when the guest is in the room. Many people would prefer privacy but do not have an appropriate opportunity to inform the hotel of that preference.

Furthermore, hotels would benefit greatly from real-time monitoring of guest satisfaction, in terms of swift remediation efforts as well as to potentially capitalize on positive reviews on associated social media platforms. However, without a system in place to provide effective communication with guests of all different levels of sophistication and/or attentiveness, many opportunities to correct a problem or to obtain a helpful review go missed.

The techniques herein, therefore, provide a system and method for managing hotel guest satisfaction within an automated guest satisfaction and services scheduling system. In particular, the techniques herein provide a method and system to manage guest satisfaction and to allow guests to easily navigate various satisfaction-based facilities through the interactive interface. For instance, the interface may include various modal notifications regarding guest experience inquiries, such as requesting the guest to enter their current assessment of their stay or to note any issues. The system also allows various navigations through the interface depending on multiple factors, including directing the guests to associated review platforms.

Notably, "LAN" refers to a local area network, which is a computer network that interconnects computers within a limited area, such as a residence, a business, or an office building. Also, "PMS" refers to a property management system, which is a platform that enables a hotel or group of hotels to manage front-office capabilities, such as booking reservations, guest check-in/check-out, room assignment, managing room rates, billing, food and beverage operations, housekeeping and maintenance management, sales and catering, and revenue management.

One medium a hotel may use to deliver on-demand, customized content to hotel guests is a hotel-wide communications network based on placing communication terminals in every hotel room. These communication terminal may be a tablet computing device owned, rented, leased or licensed by the hotel, dedicated to an assigned room and configured with applications specific to guest interaction, as well as basic tablet computing functionality such as a touch screen, speakers and microphones, and network connectivity. Communication terminals may be off-the-shelf tablet computers, custom communications consoles, touch-screen televisions with wireless connectivity, or even systems similar to smart home controllers where a small computing module allows a guest to control audiovisual and other connected devices in their assigned room (e.g., speakers and televisions, lights, curtains, etc.) via the interface and/or voice recognition, optionally with various additional machine learning/artificial intelligence capabilities.

To send customized content to specific communication terminals, a hotel may install a centralized control system for all communication terminals, in the form of a hotel server. The hotel server may be a dedicated server, programmed specifically for the task of determining information for a specific guest and providing appropriate configuration commands to the communication terminals. The hotel server may receive inputs from existing data repositories, such as a PMS, member profile databases, a loyalty rewards program database, other databases available over the Internet, and digital libraries of existing content. Based on inputs received, the hotel server may configure communication terminals throughout the hotel to load and display on-demand the content specifically targeted toward a guest accessing the communication terminal in their assigned room, particularly as described below.

Referring to FIG. 1, the system 100 in one embodiment comprises a PMS 102, a hotel server 104, one or more guest information databased, such as a guest profile database 110 and a loyalty rewards program database 112, an Internet 114, a hotel LAN 116, communication terminals 118, a guest services entity 120, and an automated scheduler 122. In such an embodiment, the hotel server 104 may include a processor 106 and a memory 108 configured to implement the method disclosed herein. The communication terminals 118 may alternately or additionally include a processor 106 and memory 108 configured to implement the method disclosed herein.

The PMS 102 may be the administration and accounting system used by the hotel to identify guests, assign rooms at check-in, and store a record of a guest's registration information. The PMS 102 may be a server or database that resides within the hotel or at a remote location. The PMS 102 may have a wired or wireless communications connection to the hotel server 104. Through the communications connection, the PMS 102 may notify the hotel server 104 that a guest has been registered, and transmit pertinent registration information, such as the guest's name and assigned room.

The hotel server 104 may be a server installed in the hotel or remotely in the Cloud that manages the configuration of communication terminals 118 to load customized content. The hotel server 104 may have a wired or wireless connection to the Internet 114, allowing communication with a guest profile database 110 and an online loyalty rewards program database 112. The hotel server 104 may connect to the communication terminals 118 through a hotel LAN 116, or if the hotel server 104 is remotely located, through the Internet 114. The hotel server 104 may signal the communication terminals 118 to provide device addressing and guest room details. The mechanisms that accomplish this are shown in greater detail in FIG. 3.

The guest profile database 110 may store information pertaining to guests who have visited the hotel or affiliated hotels in the past. This information may include a guest's preference settings (e.g., wakeup call times, room temperature, and housekeeping services), as well as other information such as personal information (e.g., name, address, demographics, etc.). Access to this database, for example, may allow the interactive interface created for a guest to offer a guest's previous selections as default options in selection menus, among other things.

The loyalty rewards program database 112 may store information pertaining to guests who hold membership in the hotel's customer loyalty program. Customer loyalty information may comprise the guest's name and contact information, a customer loyalty program ID number, and categorization within one or more loyalty tiers (e.g., gold membership or platinum membership). Customer loyalty information may also include details about the guest's history with the hotel, hotel chain, and any other participating partners. For example, the loyalty rewards program database 112 may store a record of nights stayed at the hotel, miles traveled on a partnered airline, or money spent on a loyalty credit card, and the rewards thereby earned. Information from the loyalty rewards program database 112 may be integrated into the interactive interface customized for a guest, such as, for example, in order to offer loyalty rewards program points or privileges as an incentive for forgoing housekeeping services, as described below.

Notably, either of the databases 110 and 112 above may be a public or private database residing at the hotel or at a remote location. In some embodiments, the either of the databases may also be integrated with the PMS 102, allowing the hotel to send information directly to the hotel server 104, with no database query needed.

The communication terminals 118 may be located in each hotel room and may incorporate real-time voice and data communications, with the capability for both unidirectional (one-way) broadcast and bidirectional (two-way) interaction with the guest. As noted above, these devices may be off-the-shelf tablet computers or custom communications consoles, or they may also be smart home-style systems. The communication terminals 118 may accept a control signal from the hotel server 104 indicating how they may boot up.

The hotel LAN 116 may be a closed hotel intranet carried over wired or wireless data channels, or any other communications channel in place throughout the hotel. The hotel LAN 116 provides connection between the hotel server 104 and the communication terminals 118.

The hotel server 104 may receive a signal back from the communication terminals 118 indicating a guest's choices, such as with regard to when they wish to schedule housekeeping services, when they desire to check out, or other selections, as described further below. The hotel server 104 may communicate the guest response to a guest services entity 120. This may be an automated scheduler 122 that receives a signal containing the pertinent information and automatically updates a scheduling database or similar application. Alternately, the communication may be in the form of an email to a person or entity, such as those responsible for staffing and planning housekeeping services each day, review platforms, and so on. In some embodiments, the hotel server 104 may update the guest profile database 110 with this information.

Figure 2:
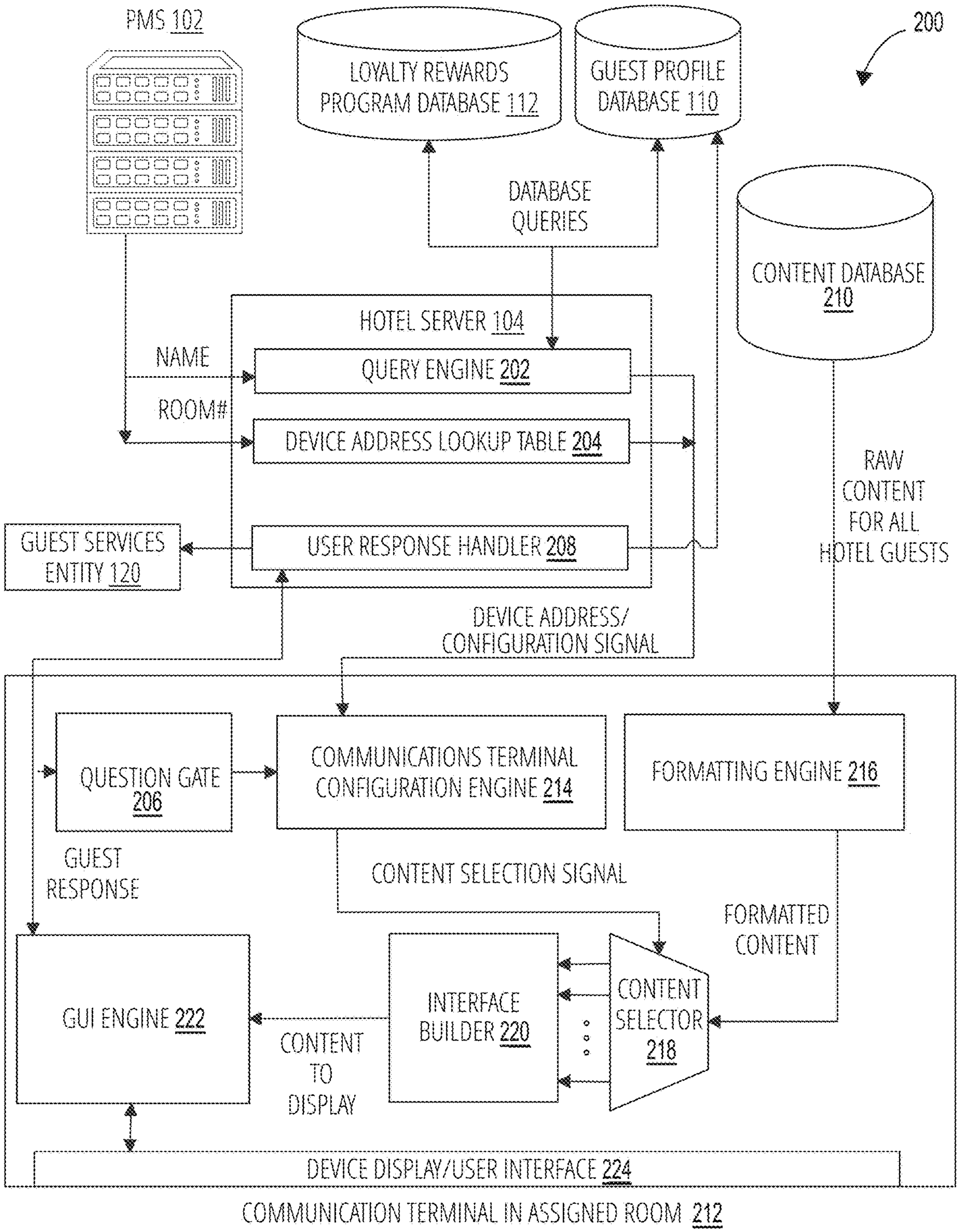
FIG. 2 illustrates an example system in accordance with one embodiment.

Referring to FIG. 2, the system 200 in one embodiment comprises a PMS 102, a hotel server 104, a guest profile database 110, a loyalty rewards program database 112, a content database 210, and a communication terminal in an assigned room, hereinafter "communication terminal 212". The hotel server 104 may contain logic for a query engine 202, a device address lookup table 204, and a user response handler 208. The communication terminal 212 may include a question gate 206, a communications terminal configuration engine 214, a formatting engine 216, a content selector 218, an interface builder 220, a GUI engine 222, and a device display/user interface 224.

The query engine 202 in the hotel server 104 may receive a guest's name (or other identification, such as a username, account number, etc.) from the PMS 102 upon check-in and may send queries to the guest profile database 110 and loyalty rewards program database 112. Results of these queries may include the guest's loyalty tier level, loyalty rewards points accrued, and purchase history related to the loyalty rewards program, as well as a guest's preferences indicated and/or learned during previous stays at the hotel or its affiliated properties or other pertinent information. Query results may be used to generate a guest identification signal that may contain guest and loyalty data in an assigned room to select customized content as indicated by the query results, as described herein.

The hotel server 104 may also receive the guest's assigned room number from the PMS 102. This assigned room number may be sent to a device address lookup table 204 that may provide addressing information needed to signal the correct device (in this case, the communication terminal 212). The device address may be an IP address assigned by the hotel LAN, a MAC address programmed into a network adapter installed in the communication terminal, or some other unique address by which the device can be distinguished over the hotel LAN 116. The device address is sent over the hotel LAN 116 to configure the addressed communication terminal device to boot and configure its interactive interface as directed.

The communications terminal configuration engine 214 may receive the guest identification signal from the hotel server 104. The communications terminal configuration engine 214 may execute a set of commands instructing the communication terminal in assigned room 212 to start up. The communications terminal configuration engine 214 may also configure the communication terminal in assigned room 212 to display the interactive interface based the guest information provided to it by the hotel server. All communication terminals 118 may have the same content from which to choose, or else may be based on other formatting/content criteria.

Content that a hotel wishes to present to its guests may be stored in a content database 210. This content is available to each communication terminal. Updates to content in the content database 210 may be automatically pushed down to communication terminals, or the communication terminals may be programmed to periodically monitor the content database 210 for added, removed, or modified content. Content may also be updated multiple times in a draft state or "sandbox" area and be sent to communication terminals only when it is approved and published through a content management platform.

The communication terminal 212 may import content from the content database 210. Content transmitted to the communication terminal 212 may be sent to a formatting engine 216. The formatting engine 216 may recognize content tagged as being already compatible with interactive interface requirements. Compatible content may be sent directly through with no modification. Files sent with no tagging or tagging that indicates a possible incompatibility may be ignored.

Formatted content may be customized for a particular guest by passing through a content selector 218. A content selection signal generated by the communications terminal configuration engine 214 based on the content received from the communication terminal 212 may be used to filter the content and construct an interactive interface appropriate for each individual guest.

Selected content may be sent to an interface builder 320. The interface builder 320 may generate a graphical user interface (GUI) using markup code, such as HTML or XML. The GUI may also be implemented as machine logic, such as JavaScript, that may be integrated into a browser or other web-based application installed on the communication terminals, or as a non-transitory machine logic configuration for operating a computer processor. This interface, when instantiated by the processor may comprise links, buttons, text interface, and graphics. The interactive interface may also provide instructions and functionality allowing the guest to access a Web page or complete a simple form in order to take advantage of an offered (e.g., loyalty-based) reward.

A GUI engine 222 may be used to transmit the interactive interface to a device display/user interface 224. In a preferred embodiment, the device display/user interface 224 may be a touch screen capable of passing a user input signal back to the GUI engine 222. The GUI engine 222 may interpret user input as a menu selection, such as described herein.

Operationally, the techniques herein provide for managing hotel guest housekeeping, satisfaction, and departures within an automated guest satisfaction and services scheduling system. Each component of the system may operate independently or in conjunction with one another, and any hotel system need not implement all of the systems and methods described herein.

According to a first component of the automated guest satisfaction and services scheduling system described herein, the techniques herein provide an automated housekeeping scheduling service for a hotel based on guest input and history. Information from a guest record generated at check-in may be used to configure and activate an interactive interface implemented on a communication terminal in the guest's assigned room. Guest registration information may include the guest's name, assigned room, and stay duration. The guest registration information may be provided by a property management system (PMS) used by the hotel to manage guest reservations and other hotel services.

The stay duration information may comprise the guest's time of check-in, as well as the guest's anticipated date and time of check-out. The check-out time may default to the hotel's standard check-out time or may indicate that a late check-out has been requested. If the stay duration includes only one night, the automated housekeeping scheduling system may immediately schedule housekeeping for a time after the stay duration has ended. No additional steps need be followed, unless the stay duration is extended during the guest's stay. Such an extension may include adding one or more additional nights, which may trigger the process for a longer stay duration. An extension may also include an approved request for late checkout, which may immediately reschedule housekeeping for a later time as needed.

For stay durations that include more than one night, the system may use the guest's assigned room information to identify a communication terminal located in that room.

The guest name and/or unique identification number may be used to query a guest profile database, loyalty rewards program database, and other databases that might contain information that may be used to customize a guest's interactions with the communication terminal in their assigned room. In some embodiments, a guest profile database may include guest housekeeping preferences based on the guest's previous interactions when staying at the hotel (e.g., learned and/or set). These may be used to set a default option to be displayed on the communication terminal through the process below, so that the guest may easily indicate a preferred housekeeping services option. Information from a loyalty rewards program database may be used to customize the guest's interactions based on the guest's loyalty rewards eligibility.

Guest registration information may be used to construct an interactive interface that may be implemented on the communication terminal in the guest's assigned room. The interactive interface may be a graphical user interface (GUI) that displays any information the hotel has identified as being of interest to their guests. For the purposes of the method disclosed herein, the interactive interface may include a modal window prompting the guest to select a time frame during which they would prefer housekeeping services be scheduled for their room (e.g., a preferred housekeeping services time slot of 1 pm-3 pm the following day), or to elect to forgo housekeeping services during their stay. This window may remain active on the device display screen until a selection has been made. An incentive may be offered for guests that forgo housekeeping services. The incentive may include loyalty rewards program points for guests who participate in a loyalty rewards program. The incentive may include a voucher for use at a shop or restaurant or other business affiliated with the hotel. Guests may be offered a list of incentives to choose from once they have opted to forgo housekeeping services.

After the interactive interface implementing these customizations has been constructed, the communication terminal in the assigned room may be configured to display the customized interactive interface. The guest may be prompted as described above to select a time frame for housekeeping services or to elect to forgo housekeeping services. The guest may enter their response using the communication terminal touch screen. The guest's response may be communicated to a housekeeping services scheduler. The housekeeping services scheduler may be an automated scheduling application that accepts a signal that includes the assigned room and the guest's preferences and updates a scheduling database accordingly. The housekeeping services scheduler may be a software program that has an integration with the hotel's system, or could be a person who receives guest responses as emails from the automated scheduling system, either individually, or as an aggregated report at the end of the day. The automated scheduling system may also be configured to use the guest response to update the guest housekeeping preferences in the guest profile database.

The housekeeping services scheduler may use the signal, email, or other notification the automated scheduling system may be configured to transmit, to staff and plan for upcoming housekeeping services' needs.

Figure 3:
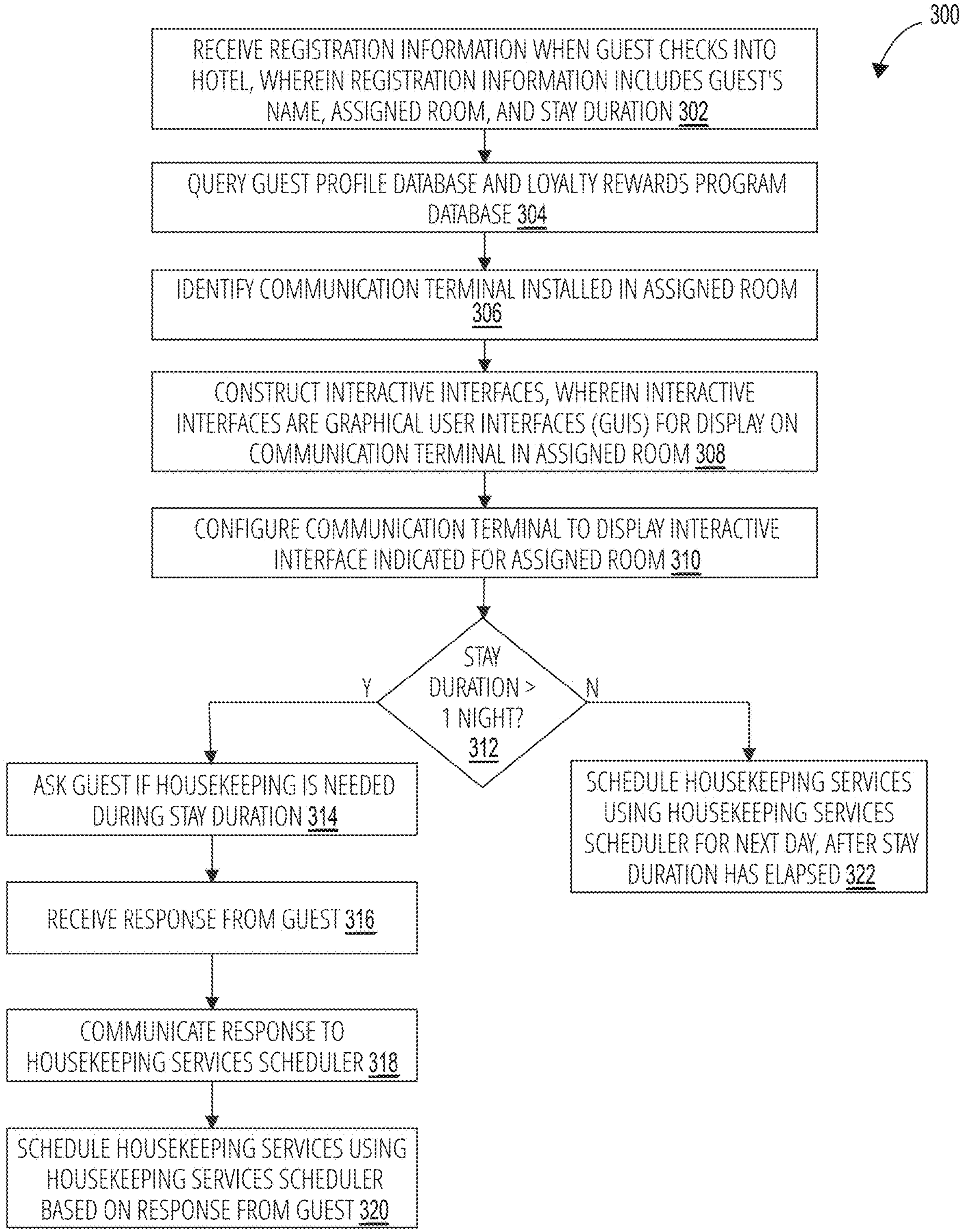
FIG. 3 illustrates an example housekeeping scheduling routine in accordance with one embodiment.

Referring to FIG. 3, in block 302, a routine 300 receives registration information when a guest checks into a hotel, wherein the registration information includes the guest's name, assigned room, and stay duration. In block 306, routine 300 identifies a communication terminal installed in the assigned room. In block 308, routine 300 constructs interactive interfaces, wherein the interactive interfaces are graphical user interfaces (GUIs) for display on the communication terminal in the assigned room. In block 310, routine 300 configures the communication terminal to display the interactive interface indicated for the assigned room. In block 314, routine 300 asks the guest if housekeeping is needed during the stay duration (e.g., and at what preferred time, if so). In block 316, routine 300 receives a response from the guest. In block 318, routine 300 communicates the response to a housekeeping services scheduler (e.g., a preferred time, or forgoing service). In block 320, routine 300 schedules housekeeping services using the housekeeping services scheduler based on the response from the guest.

The automated scheduling system herein may also interface with visual notifications that may be installed for each guest room. For example, a corridor of guest rooms may be configured with a lighted display at each door and proximity sensors mounted along the corridor. The proximity sensors may be infrared sensors. As the sensors sense the approach of a housekeeping cart, the lighted display may light up green to indicate that the specific room requires housekeeping attention and is empty. If the guest has opted out of housekeeping services, the display may remain off. Motion sensors within the room or sensors, such as microphones, in the communication terminal may be configured such that, if a guest presence is detected in the room, the lighted display may light up yellow or red to indicate that housekeeping services may be postponed. In this manner, the automated scheduling system may be used to allow housekeeping personnel to more efficiently perform their tasks without disturbing guests, providing for both more effective scheduling and a better guest experience.

Figure 4:
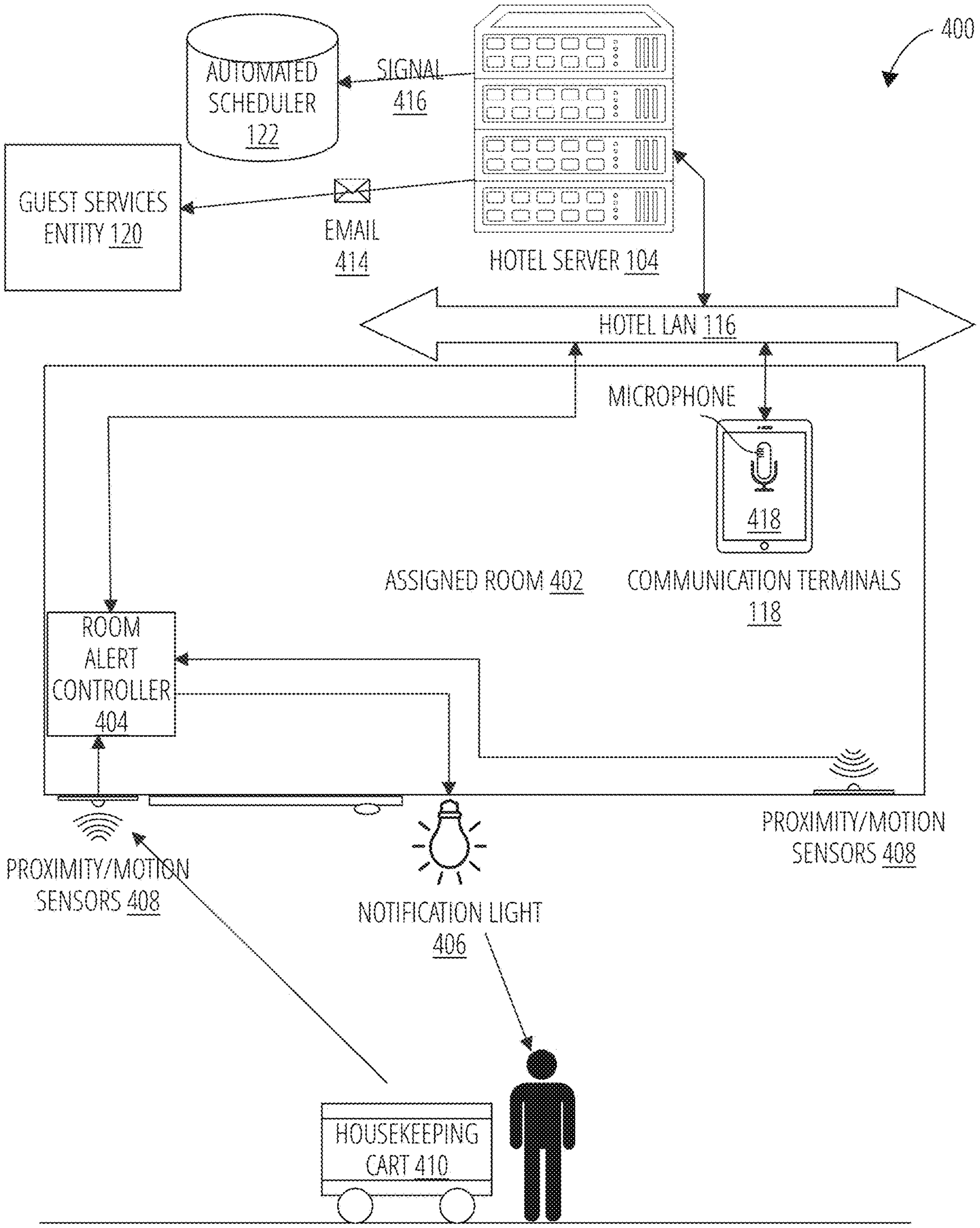
FIG. 4 illustrates an example of housekeeping notification channels in accordance with one embodiment.

Referring to FIG. 4, the housekeeping notification channels 400 that the automated scheduling system may utilize may comprise communication with a room alert controller 404, a signal 416 to an automated scheduler 122, an email 414 to a guest services entity 120, or some combination of these and other elements.

As discussed above, communication terminals 118 in assigned rooms may communicate guest interactions over a hotel LAN 116 with a hotel server 104. These interactions may include responses to queries about when the guest would like to schedule housekeeping services. Such responses may be communicated as a signal 416 to an automated scheduler 122 in order to automatically update a housekeeping planning system. Guest responses may also be used to generate an email 414 reporting guest housekeeping preferences to a guest services entity 120. In an embodiment, the guest responses may be sent to an Application Programming Interface (API) provided by the guest services entity 120. The guest services entity 120 may be a computerized system or a person or entity that schedules staff and plans tasks for upcoming housekeeping work.

In addition to these notifications, the communication terminals 118 or hotel server 104 may interact with a room alert controller 404 to provide the ability to visually alert housekeeping workers as they pass by a room. The room alert controller 404 may be coupled to a microphone 418 and/or light/proximity/motion sensors 408 within a room. The microphone 418 may be part of the communication terminals 118 sensors dedicated to that room. The proximity sensors may be infrared sensors. When a guest indicates a housekeeping services selection (either a time frame for housekeeping services or a desire to not be disturbed), a signal may be sent to the room alert controller 404. Alternatively, the signal may be sent to a central hotel controller that triggers the room alert controller 404.

If a microphone 418 or proximity/motion sensors 408 detect a person within the room, a notification light 406 outside the room may be configured to indicate the person's presence within the room. For security reasons, this system may only display an occupation indicator to housekeeping personnel when they enter the area, as detected by proximity/motion sensors 408 in the corridor. Alternately, the notification light 406 may be configured with a keypad or other device to accept a pressed code or detect the presence of a secure token. In this way, the availability of the room for housekeeping may be verified without the need to knock on doors up and down the corridor.

According to another component of the automated guest satisfaction and services scheduling system described herein, the techniques herein provide particularly for managing satisfaction of guests. For instance, in certain embodiments herein, guests may be asked some variant of "how is your stay going". If the guest is happy (a positive satisfaction assessment/response), then the techniques herein may route the guest to another screen/menu on the interactive interface of their communication terminal promoting a loyalty program signup. In the guest is unhappy (a negative satisfaction assessment/response), then the techniques herein may either send a report to management, or may send a report directly into the hotel's guest response system.

In addition, when an issue is reported or other negative response (a "negative branch"), then the techniques herein may display all or some combination of a) shortcut icons to most frequently reported issues or needed items, b) a chat window to chat directly from the tablet, c) a phone number entry window to have the hotel call the guest direct, and so on.

Conversely, when on a positive branch, a guest may be presented with a loyalty membership promotion, where if they indicate that they are interested in joining the loyalty club, the techniques herein can either send that guest's name and (if provided) phone number to a hotel employee for follow up, or else that guest may be presented with an online signup website.

Figure 5:
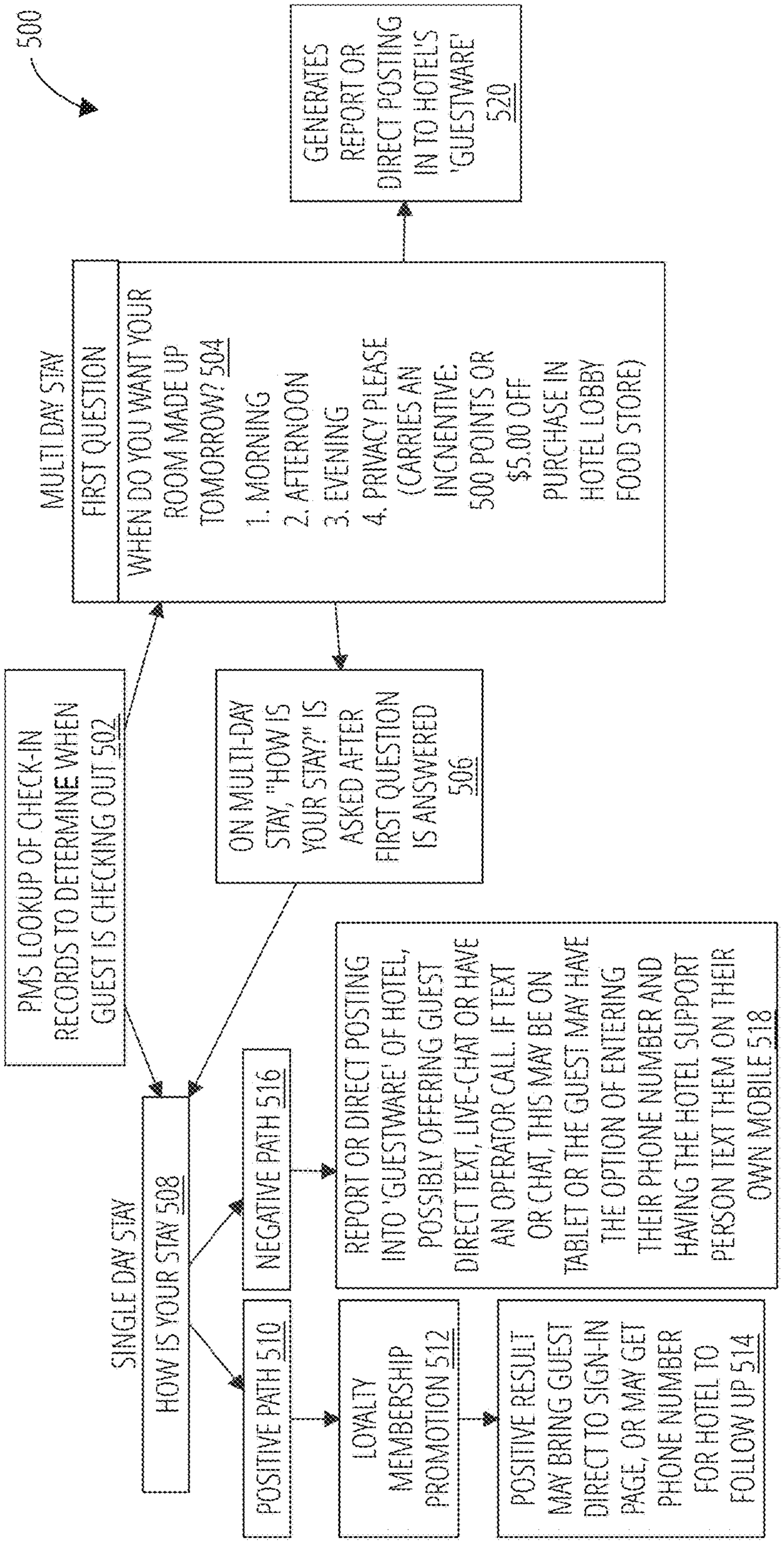
FIG. 5 illustrates an example method in accordance with one embodiment.

FIG. 5 illustrates an example method 500 in accordance with one embodiment of the disclosure. In particular, a PMS lookup of check-in records may occur in block 502 to determine when a guest is checking out. If a multi-day stay, then in block 504 the first question may be regarding housekeeping scheduling preferences, such as described above. For example, the question "when do you want your room made up tomorrow?" may be presented to the guest, with options such as "morning," "afternoon," "evening," or "privacy please" (forgoing services), which may carry an incentive, such as some number of loyalty points, a discount (e.g., $5.00) off a purchase in the hotel lobby food store, and so on. After this first question in block 504 is answered, then the communication terminal may release the method in block 506 to proceed.

In block 508, whether for a single day stay or after a multi-day stay housekeeping question has been answered, the satisfaction assessment question, such as "how is your stay" may be presented on the interactive interface of the communication terminal in the guest's room. If the response is positive (i.e., happy guest), then the techniques herein may present the guest with a loyalty membership signup (e.g., promotion) in block 512. If the guests accepts the promotion, then in block 514 the guest may be presented to a sign-in page, or may receive the phone number of the hotel's loyalty program to follow up.

On the other hand, in response to a negative satisfaction assessment in block 516, then the techniques herein in block 518 may report the response or else may direct the guest into a 'guestware' branch of the hotel, possibly offering the guest direct text, live-chat, or to have an operator call the guest. If texting or chatting, this may occur on the communication terminal (e.g., tablet), or else the guest may have the option of entering their phone number and having the hotel support person text or call them on their own mobile phone.

Many other details and options are available in the satisfaction assessment process, including those described below, and those shown and described in FIG. 5 are merely one example configuration made possible by the techniques herein.

According to still another component of the automated guest satisfaction and services scheduling system described herein, the techniques herein provide particularly for managing the departure (checkout) of guests. For instance, in certain embodiments herein, the hotel may present, via the interactive interface of the communication terminals in a guest's room, various departure time options for the following day. A hotel standard checkout time may exist, which provides the opportunity for early and/or late checkout. Early checkout, on the one hand, may be offered along with an incentive to a guest in order to assist in particularly busy times. Late checkout, on the other hand, may come at a price to the guest requesting it, such as in terms of loyalty points or money.

Figure 6:
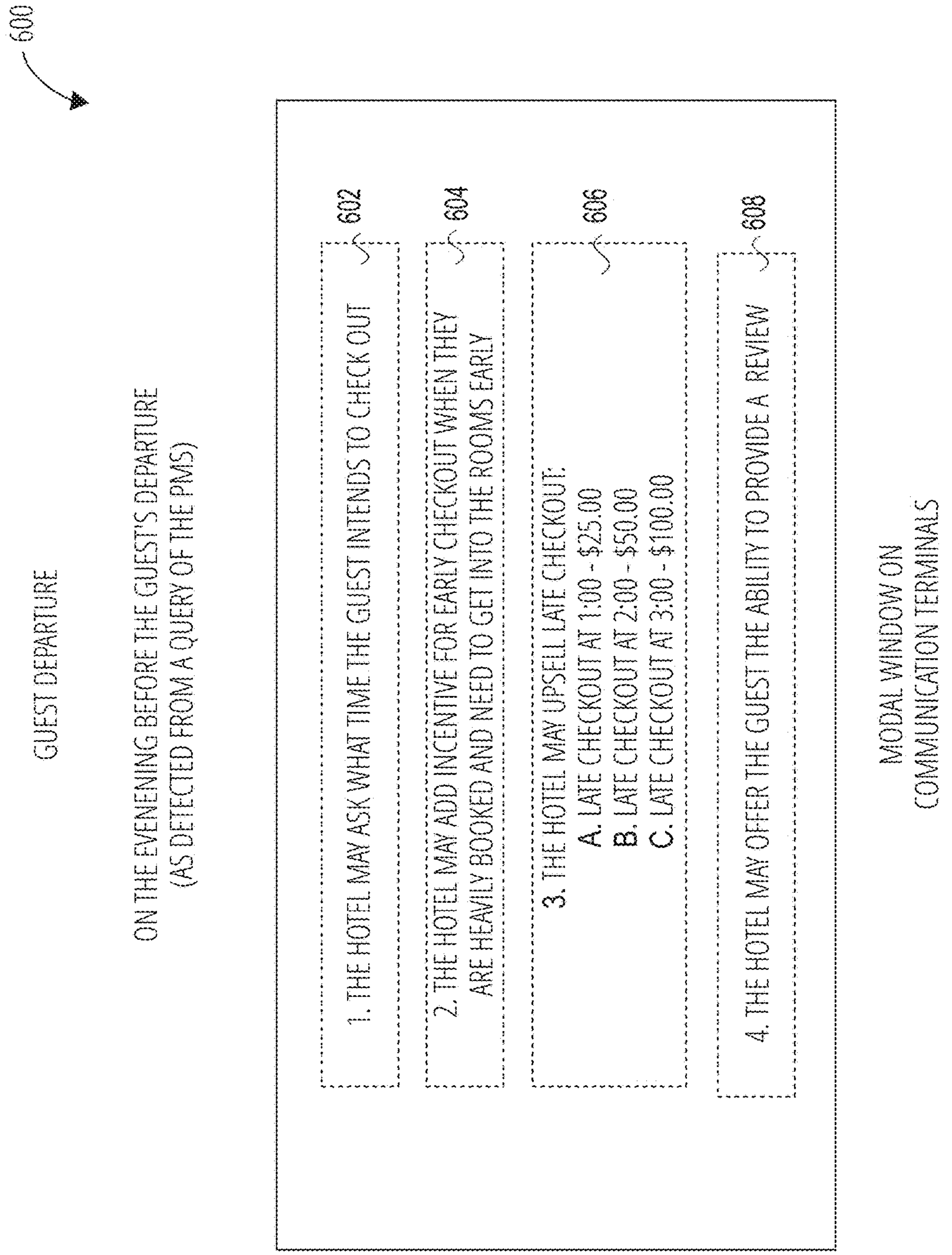
FIG. 6 illustrates an example method in accordance with one embodiment.

FIG. 6 illustrates an example method 600 in accordance with one embodiment of the disclosure. In particular, on the evening before the guest's departure (e.g., as detected from a query of the PMS), the hotel may ask what time the guest intends to check out (block 602), such as a standard time, early, or late. In block 604, the hotel may add incentive (e.g., loyalty points or money) for early checkout when they are heavily booked and need to get into the rooms early. Alternatively, in block 606, the hotel may "upsell" late checkout, e.g., a) late checkout at 1:00 p-$25.00; b) late checkout at 2:00 p-$50.00; c) late checkout at 3:00 p-$100.00, and so on.

Additionally during checkout, the hotel may also offer the guest an opportunity to provide a review on a review platform (e.g., the hotel's own or else a third-party platform). The review may be directly linked, or else may prompt a login to the review platform for completion by the guest.

Many other details and options are available in the departure management process, including those described below, and those shown and described in FIG. 6 are merely one example configuration made possible by the techniques herein.

Figure 7:
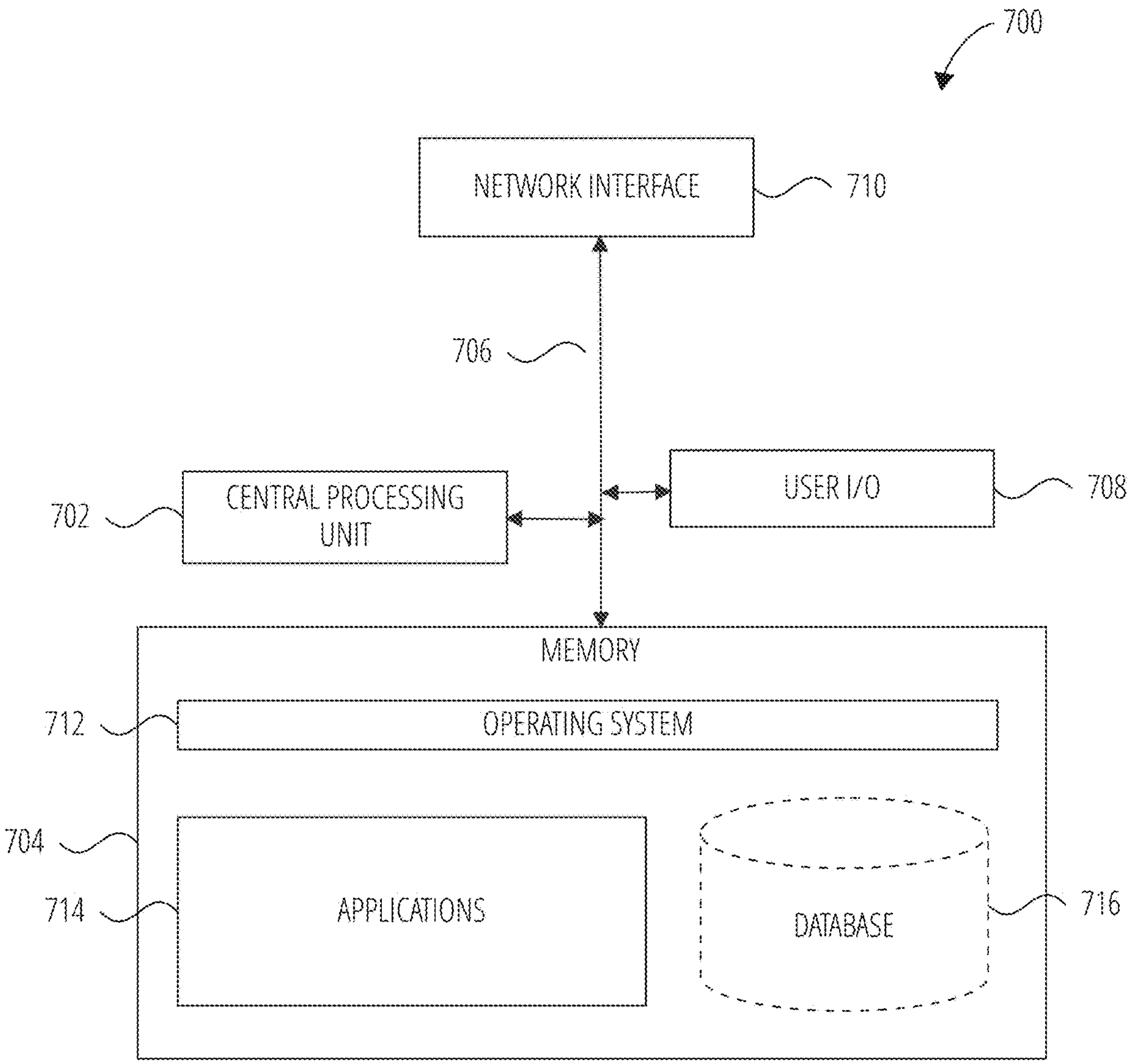
FIG. 7 illustrates an example system in accordance with one embodiment.

Referring now to FIG. 7, an embodiment of a computer system 700 useful in implementing the methods disclosed herein comprises a central processing unit 702, memory 704, a bus 706, user I/O 708, a network interface 710, an operating system 712, applications 714, and a database 716.

In various embodiments, system 700 may include a desktop PC, server, workstation, mobile phone, laptop, tablet, set-top box, appliance, or other computing device that is capable of performing operations such as those described herein. In some embodiments, system 700 may include more or fewer components than those shown in FIG. 7. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 700 may comprise one or more physical and/or logical devices that collectively provide the functionalities described herein. In some embodiments, system 700 may comprise one or more replicated and/or distributed physical or logical devices.

In some embodiments, system 700 may comprise one or more computing resources provisioned from a cloud computing provider, as will be understood by those skilled in the art.

System 700 includes a bus 706 interconnecting several components including a network interface 710, user I/O 708, a central processing unit 702, and a memory 704.

Memory 704 generally comprises a random access memory ("RAM") and permanent non-transitory mass storage device, such as a hard disk drive or solid-state drive. Memory 704 stores an operating system 712, and may also store applications 714 used for both general operation and for implementing the methods disclosed herein. Memory 704 may also include a database 716. In some embodiments, system 700 may communicate with database 716 via network interface 710, a storage area network ("SAN"), a high-speed serial bus, and/or via the other suitable communication technology.

In some embodiments, database 716 may comprise one or more storage resources provisioned from a cloud storage provider, as will be understood by those skilled in the art.

User I/O 708 may comprise one or more components allowing human interaction with the computing system 700, such as a monitor, a touch screen display, a mouse, a keyboard, a stylus, or other, similar devices.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine-readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Figure 8:
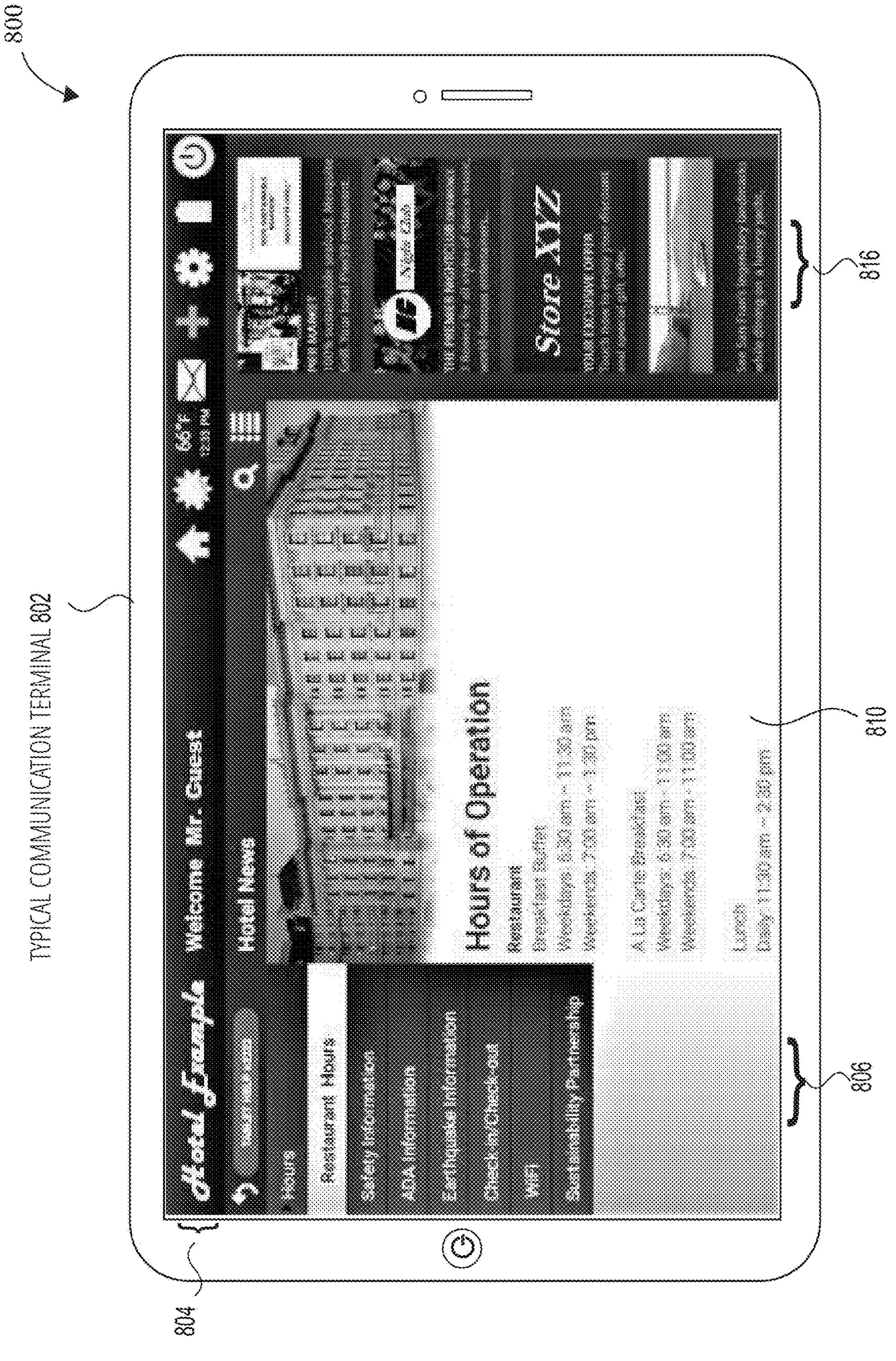
FIG. 8 illustrates an example interactive interface in accordance with one embodiment.

Additionally, an example of an illustrative interactive interface according to one or more embodiments herein is provided in FIG. 8, which shows elements that may be included in the interactive interface 800 generated for a typical communication terminal 802 located in the room of a guest. Generally, a template used by the interface builder 220 module in the communication terminals 118 may collect content for display or linked access via a number of screen modules. For example, the top of the interface may comprise a branded task bar 804. Beneath that, there may be left sidebar menu 806, center content viewing pane 810, and (optional) right sidebar content 816 areas. Customized content may be allocated to one or more of these screen areas. For example, general hotel information may be linked from the left sidebar menu 806 and displayed in the center content viewing pane 810. This information may include operating hours for hotel restaurants and services, among other things. The right sidebar content 816 may be based on other content, such as external content, offers, etc., or may be an extension of the left sidebar menu. The particular content associated with the techniques described herein may be presented in either sidebar 806 or 816, as well as in center viewing pane 810 (e.g., as selected to show a larger format of the content in the center content viewing pane when clicked in the sidebar, or else as separate pop-up content without first requiring a sidebar selection). Notably, other variants of the formatting of the interactive interface 800 may be made, and any shown and discussed herein are merely examples for illustration.

Additional and/or alternative embodiments may also be contemplated in accordance with the present disclosure and the techniques described herein. For instance, in one embodiment, the techniques herein may provide a one-touch review, such as a set of 1-5 stars, levels of happiness, scores from 1-10 and so on, which may be shared with a loyalty program, the hotel itself, or an external third-party review platform (e.g., when the guest is logged in). A two-touch (or "second-touch") portion may also be configured to "pop-up" with pre-populated basic phrases to add to the review, such as based on the initial selection. For example, based on a selected score of 5 stars: "had a great time, great place", "love it, will come back", etc., may be show, versus a 1 star selection that may show "service needs improvement" or "do not recommend staying here" as options. Alternatively or in addition, when leaving positive reviews, e.g., 4 or 5 stars, the review may be entered, but any negative or neutral review, e.g., 1-3 stars, may receive first a confirmation message such as "is there anything we can do to improve your rating?" or "please tell us why", with a collection of certain selectable items (such as incentives or fixes, like "please grab a complimentary coffee on your way out" if "too much noise at night" was selected, and so on). Note that satisfaction remediation responses herein may be offered, and may be based on loyalty tier: e.g., diamond members get a call right away, gold members get to leave their number, non-members get to select from FAQ options, etc. The remediation options may also be based on the specific offerings of the hotel, such as spa services, beach activities, reserved spots at a pool, etc.

In closing, an illustrative system according to one or more embodiments of the present disclosure may comprise: a server; and a plurality of communication terminals in communication with the server, each of the communication terminals having a graphical user interface (GUI) and being associated with a respective room of a plurality of hotel rooms of a hotel; wherein the server is configured to: receive registration information when a guest checks into the hotel, the registration information including an identification of the guest and a particular assigned room of the plurality of hotel rooms; and identify a particular communication terminal of the plurality of communication terminals that is associated with the particular assigned room; and wherein the particular communication terminal is configured to: present an interactive interface on a corresponding GUI of the particular communication terminal, the presented interactive interface querying the guest to select a satisfaction assessment from a plurality of options, the plurality of options comprising at least one positive option and one negative option; receive a selection of a particular satisfaction assessment; present, on the interactive interface and in response to selection of a positive option as the particular satisfaction assessment, one or both of a loyalty program signup and a review platform; and present, on the interactive interface and in response to selection of a negative option as the particular satisfaction assessment, one or more remediation actions for selection by the guest.

In one embodiment, one or more remediation actions are selected from a group consisting of: texting with the hotel; online chatting with the hotel; receiving a call from the hotel; providing a phone number for the hotel to call the guest; and providing a list of frequently asked questions (FAQs).

In one embodiment, one or more remediation actions comprise a selectable list of frequent issues and items, wherein selection of a particular issue initiates a corresponding action, and wherein selection of a particular item initiates a request to have the particular item sent to the particular assigned room. In one embodiment, one or more remediation actions further comprise one or more pathways for contacting the hotel.

In one embodiment, one or more remediation actions presented are selected based on a loyalty tier of the guest according to a hotel loyalty program.

In one embodiment, one or more remediation actions are selected from a group consisting of: discounts on hotel services; vouchers for hotel services; discounts on items sold at the hotel; vouchers for items sold at the hotel; discounts on hotel bills; and loyalty program points.

In one embodiment, the loyalty program signup is selected from a group consisting of: a loyalty program website; a phone number of a loyalty program; online chatting with a loyalty program; receiving a call from a loyalty program; and providing a phone number for a loyalty program to call the guest.

In one embodiment, the loyalty program signup is presented in response to the guest not already being a member of the loyalty program.

In one embodiment, the communication terminal presents the review platform as a one-touch selectable satisfaction assessment on the interactive interface, and wherein the communication terminal is further configured to receive a guest response to the one-touch selectable satisfaction assessment and share the guest response with the review platform. In one embodiment, in response to the guest response to the one-touch selectable satisfaction assessment for the review platform, the communication terminal is further configured to: present a plurality of second-touch satisfaction statements corresponding to the guest response to the one-touch selectable satisfaction assessment; receive a guest selection of a particular one of the plurality of second-touch satisfaction statements; and share, with the review platform, the guest selection of a particular one of the plurality of second-touch satisfaction statements along with the guest response.

Figure 9:
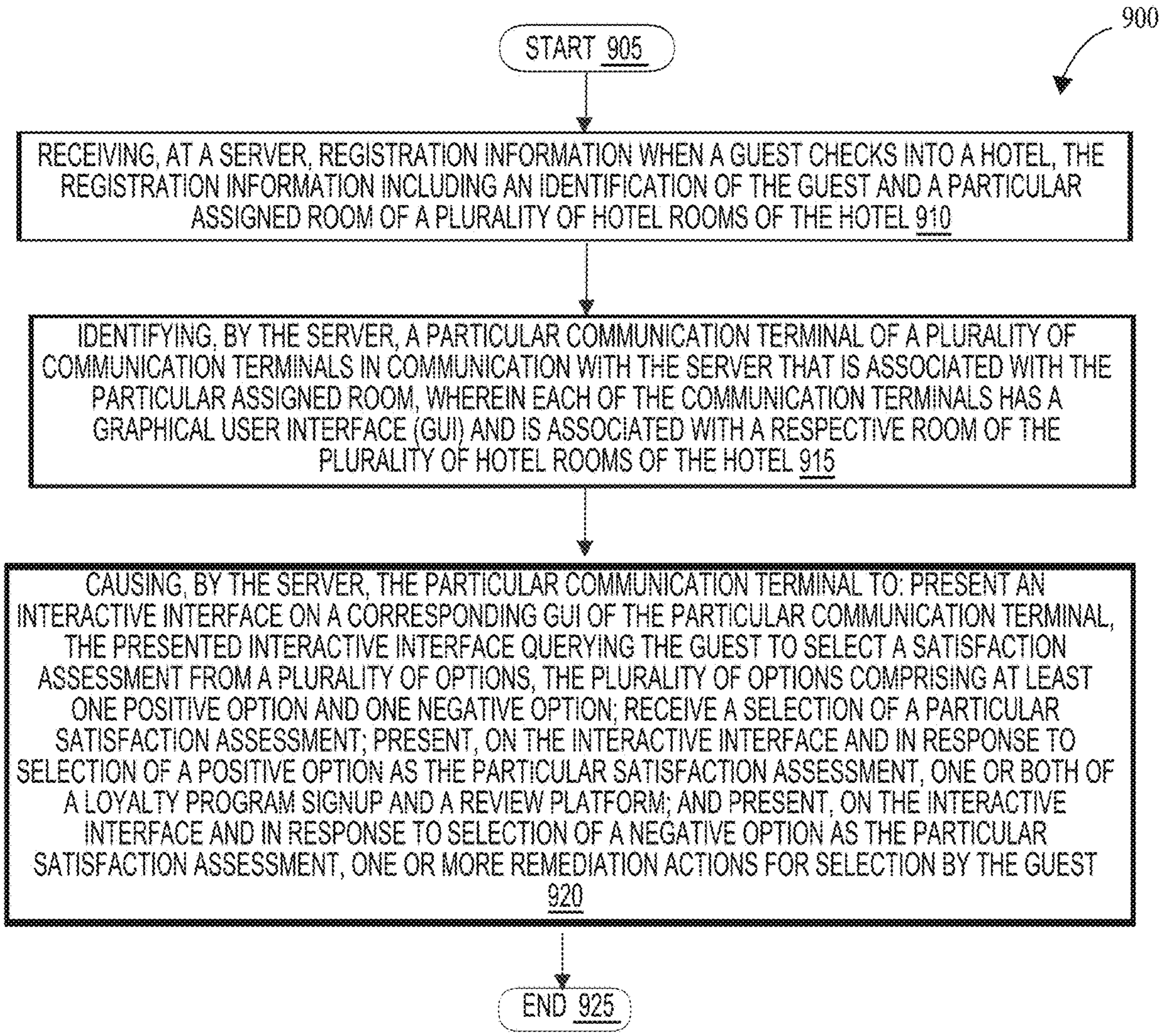
FIG. 9 illustrates an example simplified procedure for managing hotel guest satisfaction within an automated guest satisfaction and services scheduling system in accordance with one or more embodiments described herein, particularly from the perspective of a system of a hotel server.

Additionally, FIG. 9 illustrates an example simplified procedure for managing hotel guest satisfaction within an automated guest satisfaction and services scheduling system in accordance with one or more embodiments described herein, particularly from the perspective of a system of a hotel server 104. For example, a non-generic, specifically configured device (e.g., hotel server 104) may perform procedure 900 by executing stored instructions. The procedure 900 may start at step 905, and continues to step 910, where, as described in greater detail above, a server receives registration information when a guest checks into a hotel, the registration information including an identification of the guest and a particular assigned room of a plurality of hotel rooms of the hotel.

In step 915, the server identifies a particular communication terminal of a plurality of communication terminals in communication with the server that is associated with the particular assigned room, wherein each of the communication terminals has a graphical user interface (GUI) and is associated with a respective room of the plurality of hotel rooms of the hotel.

In step 920, the server causes the particular communication terminal to: present an interactive interface on a corresponding GUI of the particular communication terminal, the presented interactive interface querying the guest to select a satisfaction assessment from a plurality of options, the plurality of options comprising at least one positive option and one negative option; receive a selection of a particular satisfaction assessment; present, on the interactive interface and in response to selection of a positive option as the particular satisfaction assessment, one or both of a loyalty program signup and a review platform; and present, on the interactive interface and in response to selection of a negative option as the particular satisfaction assessment, one or more remediation actions for selection by the guest.

The illustrative procedure 900 may then end in step 925, notably with the option to provide further steps or details as described herein.

Figure 10:
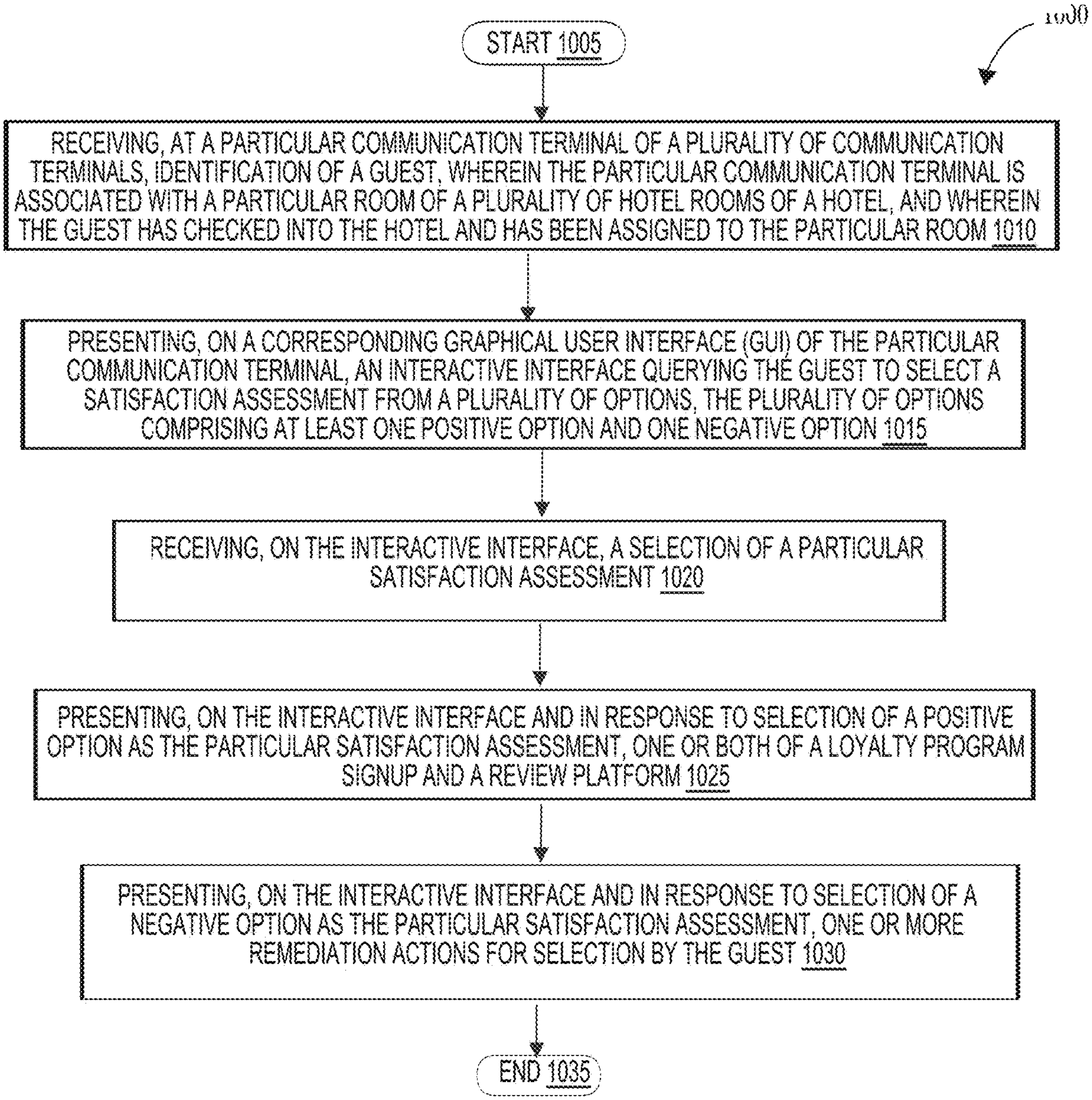
FIG. 10 illustrates another example simplified procedure for managing hotel guest satisfaction within an automated guest satisfaction and services scheduling system in accordance with one or more embodiments described herein, particularly from the perspective of a communication terminal.

Moreover, FIG. 10 illustrates another example simplified procedure for managing hotel guest satisfaction within an automated guest satisfaction and services scheduling system in accordance with one or more embodiments described herein, particularly from the perspective of a communication terminal 118. For example, a non-generic, specifically configured device (e.g., communication terminal 118) may perform procedure 1000 by executing stored instructions. The procedure 1000 may start at step 1005, and continues to step 1010, where, as described in greater detail above, a particular communication terminal of a plurality of communication terminals receives identification of a guest, wherein the particular communication terminal is associated with a particular room of a plurality of hotel rooms of a hotel, and wherein the guest has checked into the hotel and has been assigned to the particular room.

In step 1015 a corresponding graphical user interface (GUI) of the particular communication terminal presents an interactive interface querying the guest to select a satisfaction assessment from a plurality of options, the plurality of options comprising at least one positive option and one negative option.

In step 1020, the interactive interface receives a selection of a particular satisfaction assessment.

In step 1025, the interactive interface presents, in response to selection of a positive option as the particular satisfaction assessment, one or both of a loyalty program signup and a review platform.

In step 1030, the interactive interface presents, in response to selection of a negative option as the particular satisfaction assessment, one or more remediation actions for selection by the guest.

The illustrative procedure 1000 then ends in step 1035, notably with the option to provide further steps or details as described herein.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

Advantageously, the techniques described herein thus provide for managing hotel guest satisfaction within an automated guest satisfaction and services scheduling system. In particular, the techniques herein provide an improved system to solicit and log guest responses to allow for advance planning, scheduling, and overall satisfaction maintenance, through a system that is convenient enough for guests to participate in without detracting from the guest experience.

While there have been shown and described illustrative embodiments, it is to be understood that various other adaptations and modifications may be made within the scope of the embodiments herein. For example, though the disclosure was often described with respect to hotels, those skilled in the art should understand that this was done only for illustrative purpose and without limitations, and the techniques herein may be used with any temporary accommodation where housekeeping, satisfaction, and departures need to be managed, such as for house rentals, apartment rentals, condo rentals, room rentals, office rentals, and so on. Furthermore, while the embodiments may have been demonstrated with respect to certain communication environments, physical environments, or device form factors, other configurations may be conceived by those skilled in the art that would remain within the contemplated subject matter of the description above.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A system, comprising:

a server;

a property management system (PMS) for a hotel; and a plurality of communication terminals in communication with the server via a local area network (LAN), each of the plurality of communication terminals associated with a respective room of the hotel and having a graphical user interface (GUI);

the server configured to:

i) receive registration information from the PMS when a guest checks into the hotel, the registration information including an identification of the guest, a particular assigned room of the hotel, and a stay duration; and ii) identify a particular communication terminal of the plurality of communication terminals that is associated with the particular assigned room by utilizing information received from the PMS; and the particular communication terminal configured to:

(i) generate, the GUI, an interactive interface using a template comprising one or more screen modules;

(ii) control presentation of the one or more screen modules based on the stay duration such that:

(a) when the stay duration corresponds to a single-night stay, a housekeeping interface is not presented on the GUI and a satisfaction assessment interface is presented on the GUI; and (b) when the stay duration corresponds to a multi-night stay, the housekeeping interface is presented on the GUI prompting the guest to select a housekeeping services time frame or to forgo housekeeping services, and after receiving a guest selection on the housekeeping interface, the satisfaction assessment interface is then presented on the GUI;

(iii) present, via the satisfaction assessment interface, a one-touch selectable satisfaction assessment configured to receive a quest satisfaction response comprising at least a positive response and a negative response;

(iv) receive the guest satisfaction response; and (v) present in response to the guest satisfaction response and without requiring navigation away from the satisfaction assessment interface, a plurality of second-touch satisfaction statements in a pop-up to receive a selection of one of the plurality of second-touch satisfaction statements, the plurality of second-touch satisfaction statements corresponding to the guest satisfaction response, wherein the plurality of second-touch satisfaction statements comprise:

(a) for a positive one-touch selectable satisfaction assessment response, at least one of a loyalty program signup interface or a review platform interface; or (b) for a negative one-touch selectable satisfaction assessment response, one or more remediation actions for selection by the guest, the one or more remediation actions including at least one of: initiating a chat with the hotel, receiving a call from the hotel, entering a phone number for the hotel to call the guest, requesting a room item, or navigating a list of frequently asked questions (FAQs).

2. The system of claim 1, wherein the one or more remediation actions comprise a selectable list of frequent issues and items presented on the GUI, wherein selection of a particular issue initiates a corresponding action, and wherein the selection of a particular item initiates a request to have the particular item sent to the particular assigned room.

3. The system of claim 1, wherein the one or more remediation actions presented are selected based on a loyalty tier of the guest according to a hotel loyalty program.

4. The system of claim 1, wherein the one or more remediation actions further comprise at least one of: discounts on hotel services; vouchers for hotel services; discounts on items sold at the hotel; vouchers for items sold at the hotel; discounts on hotel bills; and loyalty program points.

5. The system of claim 1, wherein the loyalty program signup interface is selected from a group consisting of: a loyalty program website; a phone number of a loyalty program; online chatting with a loyalty program; receiving a call from a loyalty program; and providing a phone number for the loyalty program to call the guest.

6. The system of claim 1, wherein the loyalty program signup interface is presented in response to the guest not already being a member of a corresponding loyalty program.

7. The system of claim 1, wherein the review platform interface is presented as a one-touch selectable satisfaction assessment on the satisfaction assessment interface.

8. The system of claim 7, wherein, in response to the guest satisfaction response to the one-touch selectable satisfaction assessment, the particular communication terminal is further configured to:

present the plurality of second-touch satisfaction statements in the pop-up, receive a guest selection of a particular one of the plurality of second-touch satisfaction statements; and share, with a corresponding review platform, the guest selection of the particular one of the plurality of second-touch satisfaction statements.

9. The system of claim 1, wherein the pop-up is presented without requiring selection of a sidebar or navigation control.

10. The system of claim 1, wherein the template defines a plurality of regions of the GUI, and the one or more screen modules are selectively presented within the plurality of regions.

11. A method, comprising:

receiving, at a server, registration information from a property management system (PMS) when a guest checks into a hotel, the registration information including an identification of the guest, a particular assigned room of the hotel, and a stay duration;

identifying, by the server, a particular communication terminal of a plurality of communication terminals that is associated with the particular assigned room by utilizing information received from the PMS;

generating, by the particular communication terminal on a graphical user interface (GUI), an interactive interface using a template comprising one or more screen modules;

controlling, by the particular communication terminal, presentation of the one or more screen modules based on the stay duration such that:

(i) when the stay duration corresponds to a single night stay, a housekeeping interface is not presented on the GUI and a satisfaction assessment interface is presented on the GUI; and (i) when the stay duration corresponds to a multi-night stay, the housekeeping interface is presented on the GUI prompting the guest to select a housekeeping services time frame or to forgo housekeeping services, and after receiving a guest selection on the housekeeping interface the satisfaction assessment interface is presented on the GUI;

presenting, by the particular communication terminal via the satisfaction assessment interface, a one-touch selectable satisfaction assessment configured to receive a guest satisfaction response comprising at least a positive response or a negative response;

receiving, by the particular communication terminal, the quest satisfaction response; and presenting, by the particular communication terminal in response to the guest satisfaction response and without requiring navigation away from the satisfaction assessment interface, a plurality of second-touch satisfaction statements in a pop-up to receive a selection of one of the plurality of second-touch satisfaction statements, the plurality of second-touch satisfaction statements corresponding to the guest satisfaction response, wherein the plurality of second-touch satisfaction statements comprise, (i) for a positive one-touch selectable satisfaction assessment response, at least one of a loyalty program signup interface or a review platform interface; or (ii) for a negative one-touch selectable satisfaction assessment response, one or more remediation actions for selection by the guest, the one or more remediation actions including at least one of: initiating a chat with the hotel, receiving a call from the hotel, entering a phone number for the hotel to call the guest, requesting a room item, or navigating a list of frequently asked questions (FAQs).

12. The method of claim 11, wherein the one or more remediation actions comprise a selectable list of frequent issues and items presented on the GUI, wherein selection of a particular issue initiates a corresponding action, and wherein the selection of a particular item initiates a request to have the particular item sent to the particular assigned room.

13. The method of claim 11, wherein the one or more remediation actions presented are selected based on a loyalty tier of the guest according to a hotel loyalty program.

14. The method of claim 11, wherein the one or more remediation actions further comprise at least one of: discounts on hotel services; vouchers for hotel services; discounts on items sold at the hotel; vouchers for items sold at the hotel; discounts on hotel bills; and loyalty program points.

15. The method of claim 11, wherein the loyalty program signup interface is selected from a group consisting of: a loyalty program website; a phone number of a loyalty program; online chatting with a loyalty program; receiving a call from a loyalty program; and providing a phone number for the loyalty program to call the guest.

16. The method of claim 11, wherein the review platform interface is presented as a one-touch selectable satisfaction assessment on the satisfaction assessment interface.

17. The method of claim 11, wherein the pop-up is presented without requiring selection of a sidebar or navigation control.

18. The method of claim 11, wherein the template defines a plurality of regions of the GUI, and the one or more screen modules are selectively presented within the plurality of regions.

* * * * *